United States Patent [19]

Takahashi et al.

[11] Patent Number: 4,930,697
[45] Date of Patent: Jun. 5, 1990

[54] SHOPPING BASKET FOR USE WITH STROLLER

[75] Inventors: Takehiko Takahashi; Yoshiyasu Ishii; Hiroaki Matsuda, all of Tokyo, Japan

[73] Assignee: Combi Co., Ltd., Tokyo, Japan

[21] Appl. No.: 321,816

[22] Filed: Mar. 10, 1989

[30] Foreign Application Priority Data

Sep. 13, 1988 [JP] Japan .................. 63-119348[U]

[51] Int. Cl.$^5$ ............................................... B62B 9/12
[52] U.S. Cl. .................................. 224/275; 224/42.46 R; 224/42.01; 224/42.41; 224/901; 294/141; 280/650; 280/658; 280/769; 280/47.38; 383/119; 383/121
[58] Field of Search .................... 224/273, 275, 42.01, 224/42.41, 42.46 R, 901, 42.26 A, 42.46 B; 280/647, 648, 650, 769, 658, 47.38; 294/141, 142, 144, 140; 383/66, 12, 121.1, 121, 119; 220/9.3

[56] References Cited

U.S. PATENT DOCUMENTS

| | | | |
|---|---|---|---|
| 1,505,182 | 8/1954 | Wrixton | 224/42.46 R |
| 1,708,906 | 4/1929 | Sparks et al. | 224/42.46 R |
| 2,030,204 | 2/1936 | Gray | 383/121.1 X |
| 2,119,789 | 6/1938 | Krout | 383/121.1 X |
| 2,455,119 | 11/1948 | Hall | 224/42.46 R |
| 2,577,579 | 12/1951 | Hall | 224/42.46 R |
| 4,317,581 | 3/1982 | Kassai | 280/650 X |
| 4,560,096 | 12/1985 | Lucas | 224/42.42 |
| 4,577,903 | 3/1986 | Wells | 224/42.46 R |
| 4,676,416 | 6/1987 | Harmon | 224/42.46 R |
| 4,763,919 | 8/1988 | Nakao et al. | 280/658 X |
| 4,812,054 | 3/1989 | Kirkendall | 383/66 X |
| 4,815,764 | 3/1989 | Carpenter | 280/769 |
| 4,817,982 | 4/1989 | Kassai | 280/650 X |

Primary Examiner—Ernest G. Cusick
Attorney, Agent, or Firm—Sughrue, Mion, Zinn, Macpeak & Seas

[57] ABSTRACT

A shopping basket for a stroller (B) has a box-like body (7) of a square cross-section made of a fine mesh or a flexible cloth which is easily foldable. A bottom plate (8) is secured at its periphery to the lower end of the body. The box-like body has such a size and depth that it can be attached to the underside of a seat portion (61) of the stroller by holder straps (9). The bottom plate is foldable in half or in thirds in the direction of the width of the stroller such that, when the stroller body is folded up, the bottom plate is in turn folded. Thus, the shopping basket can be folded in a compact manner while attached to the stroller.

9 Claims, 3 Drawing Sheets

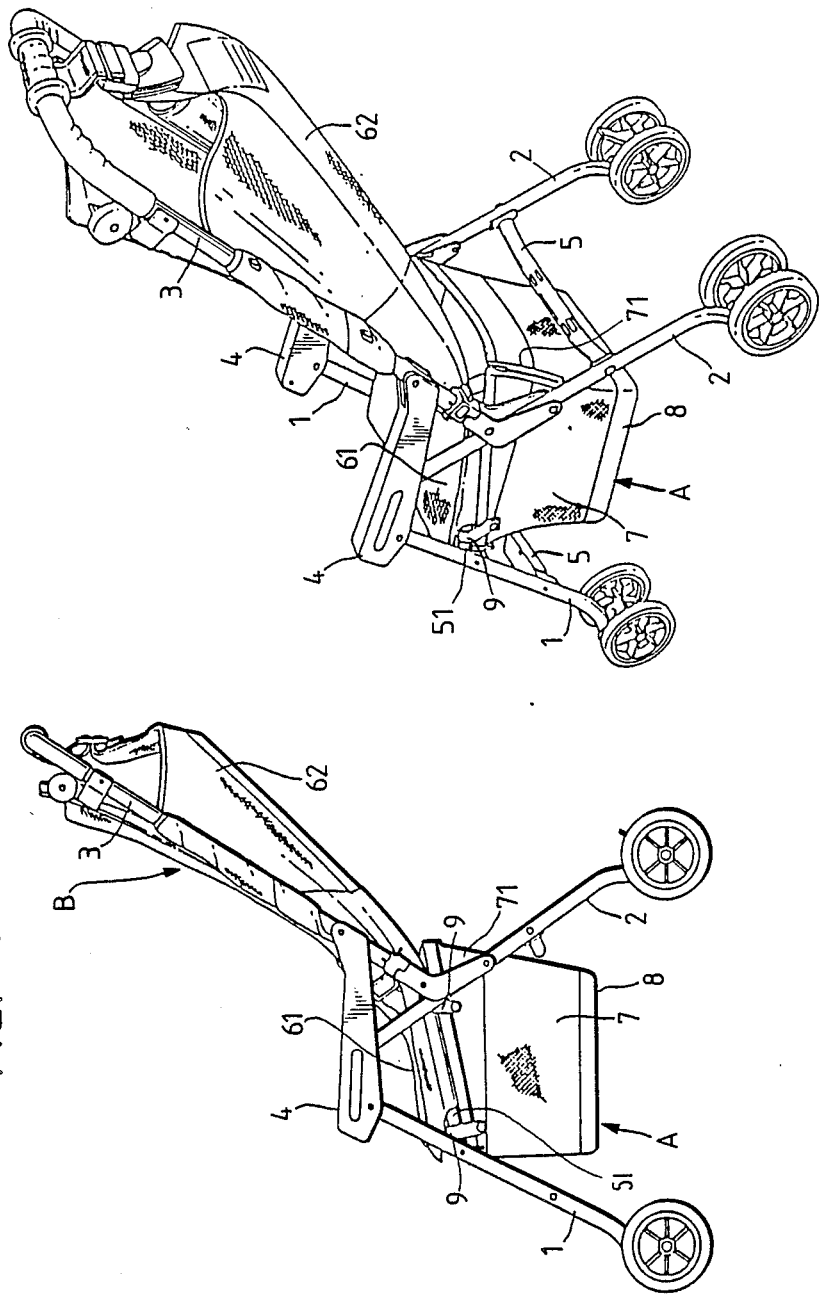

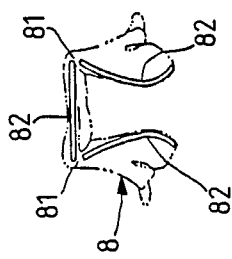
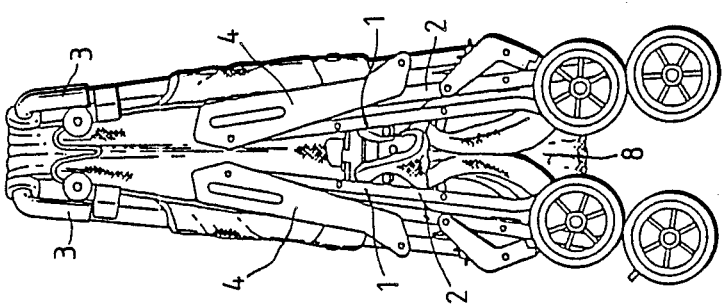
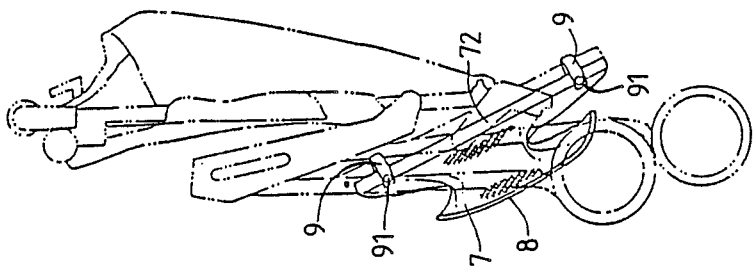
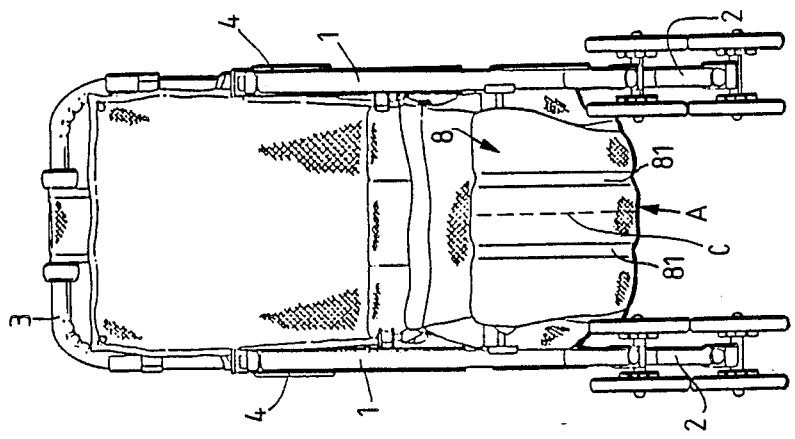

SHOPPING BASKET FOR USE WITH STROLLER

BACKGROUND OF THE INVENTION

The present invention relates to a shopping basket, and more particularly to a shopping basket capable of attachment to a stroller or pushchair that can be folded up.

It is known to attach an article-holding basket to the underside of a seat portion of a stroller so that the basket can hold the items purchased.

In most cases however, such conventional article-holding baskets are secured fixedly to the stroller body, and cannot be detached therefrom and be carried by a person who does the shopping.

In addition, in the above conventional construction, the frame of the article-holding basket is formed by rigid barlike elements of metal or the like Therefore, it is difficult to flex (or curve) the basket longitudinally to fold it, and to fold the basket in a direction of the width thereof (i.e., to reduce the width). For this reason, in most cases, when the stroller body is to be folded up, the basket portion is folded into a flattened form and then is brought into a rest position where it is held in abutment with the rear side of the stroller body as the latter is folded up.

Recently, there has been developed a stroller of the type in which an article-holding basket is freely detachable from the stroller body. In this case, also, the article-holding basket is made of rigid synthetic resin or metal bars to provide a high shape-retaining ability so that the basket can perform fully the function of a container, as is the case with the first-mentioned conventional basket Therefore, the construction is so bulky that it is not convenient to carry the basket. In addition, the problem of the inconvenience of folding up the basket has not been solved.

To overcome the above difficulties, it has also been proposed to form a shopping basket with a flexible material. In this case, however, the article-holding basket cannot be flexed (or curved) in the direction of the length, and cannot be folded in the direction of the width to reduce the width. Therefore, such a basket still has the disadvantage that it cannot be folded up in response to the folding of the stroller.

SUMMARY OF THE INVENTION

The present invention seeks to deal with the above-mentioned problems, and its object is to provide a shopping basket capable of removable attachment to a stroller.

Another object is to provide a shopping basket for strollers which is handy to carry about, can be folded up even when attached to the stroller body, an can be folded neatly folded in half or in thirds in response to the folding of the stroller body.

According to the present invention, there is provided a shopping basket for use with a stroller wherein a basket body comprises a box-like body of a square cross-section made of a net-like cloth of a fine mesh, or a flexible cloth which is easily foldable, and a bottom plate fixedly secured at its peripheral margin to a lower end of the box-like body the box-like body having such a size, and depth that it can be attached to the underside of a seat portion of the stroller; the bottom plate being foldable in half or in thirds in the direction of the width of the stroller; and a holder mechanism such as holder straps for attachment to the underside of the seat portion being mounted fixedly on an upper open end portion of the basket body.

BRIEF DESCRIPTION OF THE DRAWINGS

Other features and advantages of the present invention will be apparent from the following description when taken in connection with the accompanying drawings, wherein:

FIG. 1 is a side-elevational view of a stroller with a shopping basket attached thereto;

FIG. 2 is a perspective view of the stroller as viewed from the rear side thereof, showing in detail that portion of the basket to which slide fasteners are attached;

FIG. 5 is a front-elevational view of the stroller in its folded condition, with the shopping basket attached thereto;

FIG. 6 is a side-elevational view of the stroller shown in FIG. 5;

FIG. 7 is a front-elevational view of the stroller of FIG. 5 which is further folded in a direction of the width thereof; and FIG. 8 is a plan view of the basket in the condition of FIG. 7.

DETAILED DESCRIPTION OF THE PREFERRED EMBODIMENT

Figure 4:
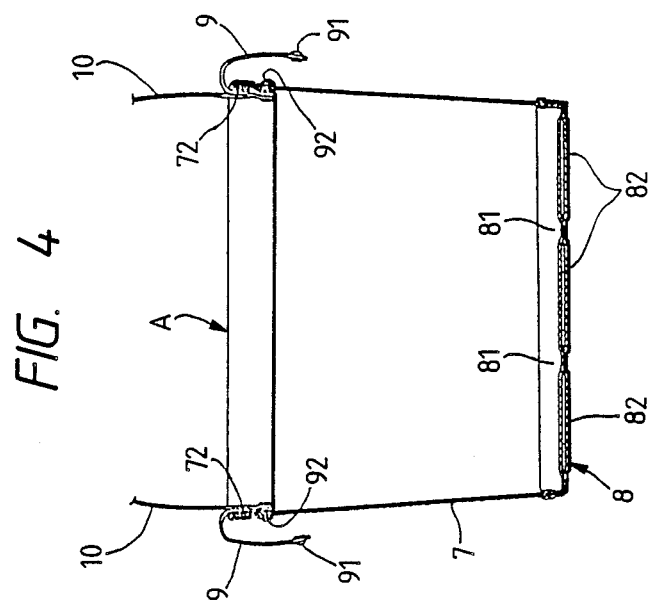
FIG. 4 is a transverse cross-sectional view of the shopping basket.
Figure 3:
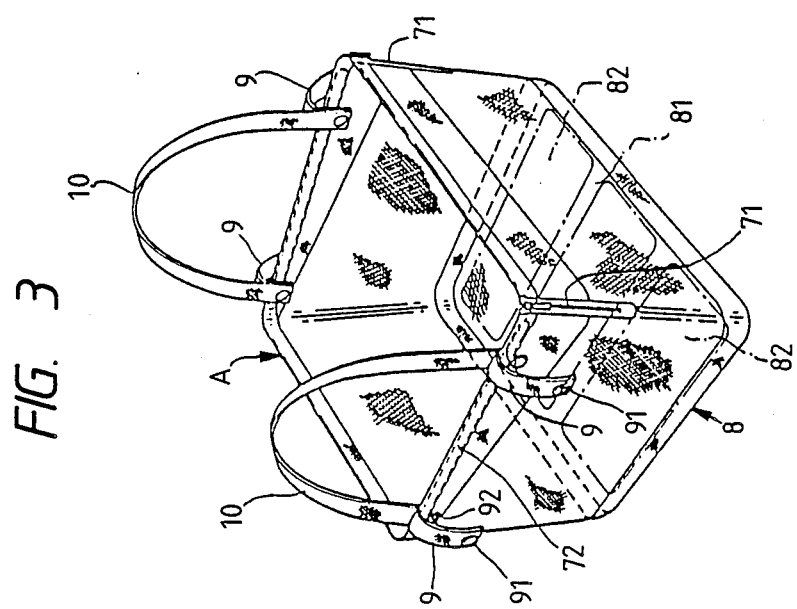
FIG. 3 is a perspective view of the shopping basket.

An embodiment of the invention will be described now with reference to the drawings.

Generally designated at B is a conventional stroller which comprises front leg bars 1, rear leg bars 2, backrest bars 3 also serving as a push handle, and arm rests 4. These components are connected together by a plurality of transverse foldable bars 5, ... 5 in a foldable manner A cloth serving as a seat portion 61 extends between, and is mounted on, connecting bars 51, 51. The bars 51 connect the front leg bars 1 to the rear leg bars 2. A cloth serving as a backrest 62 extends between, and is mounted on, the backrest bars 3. The location where the backrest bars 3 curve towards one another serves as the handle.

The term "foldable manner" mentioned above in connection with the stroller B means that the stroller body can be folded in such a manner that the front and rear leg bars 1 and 2 are moved toward each other as shown in FIGS. 5 and 6, and the thus folded stroller body can further be folded further in a direction of the width thereof as shown in FIGS. 7 and 8, so that it generally assumes a U-shape when viewed from the upper end.

A shopping basket, generally designated at A, has a tubular peripheral wall portion 7 of a generally square cross-section, and a bottom plate 8 fixedly secured at its peripheral margin to a lower end of the peripheral wall portion 7. Holder straps 9, 9 are secured to an upper end portion of the peripheral wall portion 7 defining an open top of the basket, the holder straps being adapted to be attached releasably to the connecting bars 51, 51 of the stroller body.

The peripheral wall portion 7 of the body of the shopping basket A is made of a relatively fine mesh of a flexible nature or a flexible cloth, which can be folded easily, so as not to give an unfavorable feeling to the person who carries the basket. In that condition of the basket A in which it is attached to the underside of the seat portion of the stroller B. the peripheral wall portion 7 can be folded easily inwardly of the stroller in response to the folding of the stroller.

Slide fasteners 71, 71 are provided on upper half portions of the rear corners of the peripheral wall portion 7, respectively.

By virtue of the provision of the slide fasteners 71, 71, the shopping basket A has such a height that its upper end extends to the underside of the seat portion 61 in the closed condition of the slide fasteners 71, 71. And, even in the condition where the shopping basket A is attached to the stroller B, the contents of the shopping basket A can readily be taken out readily by opening the slide fasteners 71, and thereby opening an upper portion of the rear side of the peripheral wall portion 7.

Although the height and shape of the peripheral wall portion 7 of the body of the shopping basket A are not particularly limited, it is preferred that they should correspond to the shape of the stroller B and particularly to a space of the stroller B below the seat portion 61.

For example, with respect to the peripheral wall portion 7 shown in FIG. 2, its upper end, which defines the opening, increases in height progressively toward the rear end so that it is disposed in contact with the undersides of the connecting bars 51, 51 disposed on the lateral sides of the seat portion 61. With this arrangement the shape of the peripheral wall portion 7 corresponds to the space below the seat portion 61, thereby making an effective use of this space Further, there is no spacing provided between the upper end of the peripheral wall portion 7 and the underside of the seat portion 61 so as to prevent the contents of the shopping basket A from dropping therefrom.

Shape-retaining core elements 72, 72 are mounted respectively on the lateral sides of the upper end of the peripheral wall portion 7. The core elements 72, 72 are made of a material rigid enough not to be curved easily when the basket A holds articles, and comprise, for example, a rigid synthetic resin bar or a metal bar.

The bottom plate 8 can be folded in half along imaginary line C, as shown in FIG. 5, or in thirds along partition portions 81 in the direction of the width of the stroller B With this arrangement, when the stroller body is folded up, with the shopping basket A attached to the stroller B, particularly in the direction of the width of the stroller, the bottom plate 8 can be folded in response to this folding operation of the stroller body.

Specifically, the bottom plate 8 comprises a tubular body made of a sheet of vinyl or the like and having two or three partition portions 81, . . . 81 spaced from one another in the direction of the width thereof. Core plates 82 are received respectively within the sections of the interior of the tubular body divided by the partition portions 81, 81 so as to retain a flat configuration of the bottom plate 8 In this manner, the core plates 82 perform a shape-retaining function, and each of the partition portions 81, 81 serves as a reference for the folding of the bottom plate 8.

It is preferred that the core plate 82 should be made of a material having not only a suitable shape-retaining property, but also flexibility. More specifically, examples of the core plate 82 include a synthetic resin plate a cellulose nitrate plate, and a fiber board having a suitable hardness. The holder straps 9, 9 for releasably attaching the shopping basket A to the connecting bars 51, 51 comprises a narrow tape of cloth having a suitable strength, and the proximal end of the holder strap is secured fixedly to the upper end of the peripheral wall portion 7 (more specifically, to that portion on which the core element 72 is provided) whereas the distal end is a free end.

Each holder strap 9 has a holder element 91 such as a hook button secured to the distal end thereof and the holder element 91 is adapted to be fitted releasably on a retaining element 92 secured to either the proximal end of the holder strap 9 or to the upper end of the peripheral wall portion 7 in the vicinity of the proximal end of the holder strap 9.

The holder means is not to be restricted to the holder straps 9. For example, the holder straps 9 may be replaced by holder hooks Reference numeral 10 designates handgrips for facilitating the carrying of the shopping basket A when doing the shopping.

Advantageous effects of the above-mentioned construction according to the present invention are as follows:

(1) The basket body quite easily can be attached to and detached from the stroller body merely by winding the holder straps 9,9, which are secured to the upper end of the peripheral wall portion 7, around the respective connecting bars 51, 51 and retaining them.

Particularly, with respect to the holder strap 9, the hook element 91 such as the hook button at the distal end thereof only has to be fitted on the retainer element 92, and therefore the attachment of the holder strap g to the stroller body as well as the detachment therefrom are not cumbersome, and can be effected easily by anyone.

(2) With respect to the basket body, the slide fasteners 71, 71 are provided on the upper half portions of the rear corners of the peripheral wall portion 7, respectively, so that an upper half of the rear portion of the basket can be opened. Therefore, the basket body can have such a height that it extends to the underside of the seat portion 61, and in addition, the contents of the shopping basket A can be taken out by opening the slide fasteners 71, 71 even when the basket is attached to the stroller. Thus, despite the increased height of the basket, this will not interfere with the removal of the contents of the basket.

(3) With respect to the basket body the bottom plate 8, which is flexible so as to be curved or flexed in the direction of movement of the stroller, is secured to the lower end of the peripheral wall portion 7 made of a flexible cloth. Therefore, when the basket is detached from the stroller and is carried by the person who does the shopping, the basket will not give an unfavorable feeling to this person, and can be used in a manner similar to the manner of using an ordinary shopping bag.

(4) As mentioned above, the basket body is of a flexible construction. Therefore, when the stroller body is folded up, with the basket body attached to the underside of the seat portion 61, the bottom plate 8 can be folded into a generally C-shape adjacent to the underside of the seat portion 61, when viewed from the side thereof as shown in FIGS. 5 and 6. Thus, there is no need to provide a complicated mechanism for moving the shopping basket to the rear side of the folded stroller when folding the stroller, as is the case with the conventional stroller.

(5) Further, the bottom plate 8 also can be folded in half or in thirds in the direction of the width thereof. Therefore, when the stroller body, folded in such a manner that the front and rear leg bars are moved toward each other, is folded further as shown in FIGS. 7 and 8 (namely, into a generally U-shape when viewed from the upper end thereof), the bottom plate 8 can be folded at the partition portions 81, . . . 81 defining the boundaries between the adjacent core plates 82, . . . 82. Thus, quite advantageously, the shopping basket can be folded in a compact manner.

What is claimed is:

1. A shopping basket adapted for use with a stroller which includes
    a stroller body having a pair of front leg bars, a pair of rear leg bars, and a plurality of transverse foldable bars, said front legs and said rear legs being foldably connected together by said transverse foldable bars,
    a seat portion attached to said stroller body, and
    a backrest attached to said stroller body, said shopping basket comprising:
    a basket body having a box-like body of a generally square cross-section made of a material which is easily foldable, said box-like body having such a size and depth as to be attached to the underside of said seat portion of said stroller and comprising upper open end portions, said upper open end portions having lateral sides;
    a bottom plate fixedly secured at its peripheral margin to a lower end of said box-like body, said bottom plate being foldable into a plurality of distinct portions in the direction of the width of the stroller;
    a holder mechanism for attachment to the underside of the seat portion, said holder mechanism having holder mechanism units, said holder mechanism units being fixedly mounted on said upper open end portions of said basket body, said holder mechanism units confront each other in the direction of the width of the stroller;
    openable closure members secured respectively to upper half portions of rear corners of said basket body so as to allow a rear portion of said basket body to be freely opened; and
    shape-retaining core elements mounted, respectively, on said lateral sides of said upper open end portion of said basket body, said shape-retaining core elements confront each other in the direction of the width of the stroller.

2. A shopping basket according to claim 1, wherein said holder mechanism units are in the form of holder hooks.

3. A shopping basket according to claim 1, wherein said holder mechanism units are connected to both ends of said shape-retaining core elements.

4. A shopping basket according to claim 1, further comprising handgrips attached to said upper open end portions of said basket body in opposed relation to each other, said hand grips confront each other in the direction of the width of the stroller.

5. A shopping basket according to claim 1, wherein said material of said box-like body is a net-like cloth of a fine mesh.

6. A shopping basket according to claim 1, wherein said material of said box-like body is a flexible cloth.

7. A shopping basket according to claim 1 wherein said bottom plate is foldable in half in the direction of the width of said stroller.

8. A shopping basket according to claim 1, wherein said bottom plate is foldable in thirds in the direction of the width of said stroller.

9. A shopping basket according to claim 1, wherein said holder mechanism units are in the form of holder straps.

* * * * *